Patented Sept. 10, 1935

2,013,657

UNITED STATES PATENT OFFICE 2,013,657

FLUOROAMINOANTHRAQUINONE AND ITS PREPARATION

Frank Willard Johnson, Pennsgrove, N. J., assignor to E. I. du Pont de Nemours & Company, Wilmington, Del., a corporation of Delaware No Drawing. Application August 23, 1932, Serial No. 630,057

26 Claims. (Cl. 260—60)

This invention relates to organic fluorine compounds, more particularly fluorine derivatives of the benzene and anthraquinone series, and processes for the production thereof.

It is an object of the invention to produce new organic fluorine compounds. A further object is the preparation of new derivatives of benzoyl-benzoic acids containing fluorine. A still further object is the production of new anthraquinone compounds containing fluorine. More specific objects are the production of nitro-fluoro-benzoyl-benzoic acids, amino-fluoro-benzoyl-benzoic acids and amino-fluoro-anthraquinones. Another object is the provision of new and improved processes for the production of organic fluorine compounds of the character above described. Other objects will appear hereinafter.

These objects are accomplished according to the broader aspects of the invention by a series of reactions in which: (1) a fluoro-benzoyl-benzoic acid is nitrated; (2) the nitrated product is reduced; and (3), the reduction product is treated with a dehydrating agent, the resultant product being most probably an amino-fluoro-anthraquinone.

For convenience, the invention may be illustrated with reference to the treatment of 4-fluoro-o-benzoyl-benzoic acid as a starting material. It has been found that when this compound, which has the following general formula:

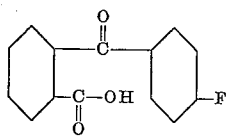

is nitrated a new compound, probably 3-nitro-4-fluoro-benzoyl-o-benzoic acid, is obtained. This nitrated product is then reduced to the corresponding amine by treatment with a suitable reducing agent such as, for example, nascent hydrogen. The reduction product is treated with a dehydrating agent such as, for example, concentrated sulfuric acid, whereby a mixture of two substances is obtained. These substances are very probably compounds having the following formulæ:

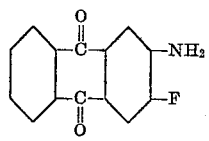 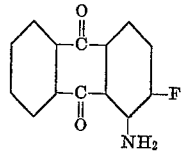

2-amino-3-fluoro-anthraquinone    1-amino-2-fluoro-anthraquinone

It has been found that the solubilities of these two compounds differ and that they may be separated, for example, by dilution of their sulfuric acid solution with water until the less soluble fraction is precipitated. The more soluble isomeride, probably 1-amino-2-fluoro-anthraquinone, may be obtained by further dilution of the sulfuric acid filtrate. If desired, a mixture of amino-fluoro-anthraquinones may be obtained by complete dilution of the sulfuric acid solution without intermediate separation of any of the compounds precipitated.

While the invention is susceptible of considerable variation and modification in the manner of its practical application, particularly as regards the nature and proportions of the various materials employed and the exact method of procedure, the following examples, in which the parts are by weight, will serve to illustrate how it may be practiced.

Example I

One hundred parts of 4-fluoro-benzoyl-o-benzoic acid were dissolved in 210 parts of 100% sulfuric acid with cooling to about 20° C. A mixture of 57 parts of nitrating acid (analyzing 46.48% $HNO_3$ and 51.4% $H_2SO_4$ with 45 parts of 25% oleum was added slowly to the cooled solution with good agitation. After agitating for an hour the temperature was raised to 50° C. for a short time and the product then poured over ice. After standing a while the product lost its gummy consistency and was filtered and washed. The resultant product was purified by dissolving it in 4800 parts of water containing sufficient sodium carbonate to give a clear solution, slightly alkaline to brilliant yellow paper, then filtering and acidifying the filtrate. This yielded a light cream colored product melting at about 166° C. After re-crystallizing from dilute alcohol and then from benzene the melting point was about 172–3° C.

Example II

Three hundred and eighty-five parts of the nitro compound obtained as described in Example I were dissolved in 419 parts of ethyl alcohol and 108 parts water and 6 parts of 37% hydrochloric acid added. Sixty-four parts of iron filings were gradually added over a period of several hours, and the mixture was heated until the reduction was complete. The mixture was then made alkaline with sodium carbonate, filtered, and the product neutralized. The resultant product was a light tan powder melting at approximately 151° C.

Example III

Three hundred and sixty-nine parts of 3-amino-4-fluoro-benzoyl-o-benzoic acid were dissolved in 1110 parts of 100% sulfuric acid and heated to 200° C. When ring-closure was complete the solution was cooled and sufficient dilute sulfuric acid added slowly to the stirred mixture to give a final acid concentration of about 80%. The product was digested for some time to obtain large enough crystals for rapid filtration, then filtered, washed with a little 80% $H_2SO_4$ and the sulfate hydrolyzed by boiling with water. Upon filtration and washing the free amine was obtained. This melts at about 278° C. By further dilution of the sulfuric acid filtrate from the crystals of sulfate another fraction was obtained, apparently mostly 1-amino-2-fluoro anthraquinone.

The nitration of fluoro-benzoyl-benzoic acids, in accordance with the invention, is subject to considerable variation. The nitrating acid may be 100% $HNO_3$ or mixtures of nitric acid and sulfuric acid such as are well known in the art as nitrating acids. If desired, the nitrating acid may have present therein an acid anhydride such as, for example, sulfur trioxide. The proportions of the nitrating agent may vary within relatively wide limits but in general it is preferable that the amount of $HNO_3$ should correspond to at least one mole for every mole of fluoro-benzoyl-benzoic acid reacted upon. The temperature employed in the nitration may vary widely but should preferably be relatively low. Very desirable results have been obtained in the use of temperatures varying within the range of about 10° to 15° C., raising finally to about 40 to 50° C.

In the reduction of the nitrated product to an amine any of the usual methods for reducing aromatic nitro compounds to amines may be employed. As a general rule, it is preferable to effect the reduction step by means of nascent hydrogen such as may be generated in the reaction mixture by the combination of an acid and a metal, as for example acetic acid and iron, hydrochloric acid and tin, and hydrochloric acid and zinc. In carrying out the reduction step, a solvent or suspension medium such as, for example, ethyl alcohol and water may be used. The temperature of the reduction may vary within relatively wide limits, for example, from room temperature to the decomposition temperature of the reactants and/or products but in general should preferably be within the range of about 50° to 60° C., raising finally to about 90–100° C.

The ring-closure or cyclization of the benzoyl-benzoic-acid may be carried out by means of any strongly dehydrating agent capable of removing water formed by the combination of a hydroxyl group from the benzoic acid residue and a hydrogen from the benzoyl residue. Generally speaking, it has been found that very desirable results may be obtained by effecting the ring-closure with a reagent such as 100% sulfuric acid. As further examples of ring-closing agents may be mentioned oleum, chlor-sulfonic acid and aluminum chloride in nitrobenzene.

The proportions of the ring-closing agent employed are subject to considerable variation but should preferably be sufficient to remove all of the water liberated by the reaction. Considerable variation may also be made in the temperatures employed in this step of the process depending largely upon the particular ring-closing agent used. In general, the reaction is preferably effected at the minimum temperature at which ring-closure is completed. This is determined by a suitable test, for example, by drowning a test portion in water, making the solution alkaline, filtering and acidifying the filtrate. If unchanged benzoyl-benzoic acid is present, a precipitate will form. In the use of concentrated sulfuric acid very desirable results have been obtained by carrying out this step of the process at a temperature within the range of about 170 to 200° C.

In recovering amino-fluoro-anthraquinones by dilution of a product such as is obtained by the reaction of an amino-fluoro-benzoyl-benzoic acid with a ring-closing agent such as concentrated sulfuric acid, the dilution may be made with water, either as such or in the form of ice; or the diluent may be a dilute acid, preferably sulfuric acid. Isolation of the various amino-fluoro-anthraquinones may also be effected with very desirable results by fractional crystallization from solvents such as, for example, nitrobenzene, acetic acid, or hydrochloric acid.

The new products produced as herein described are useful as dye intermediates and the amino-fluoro-anthraquinones are valuable dyes in themselves for coloring cellulose esters such as, for example, acetyl cellulose.

A particular advantage of the invention lies in the production of compounds not heretofore known and in the provision of a process for producing these compounds by reactions which proceed smoothly and easily and are of such character that the process may readily be operated on a commercial scale.

As many apparent and widely different embodiments of this invention may be made without departing from the spirit thereof, it is to be understood that I do not limit myself to the foregoing examples or description except as indicated in the following claims.

I claim:

1. In the production of organic fluorine compounds, the process which comprises reacting a fluoro-benzoyl-benzoic acid with a nitrating agent, treating the nitrated product with a reducing agent and reacting the reduction product with a ring-closing agent.

2. In the production of organic fluorine compounds, the step which comprises reacting a fluoro-benzoyl-benzoic acid with a nitrating agent.

3. In the production of organic fluorine compounds, the step which comprises reacting a nitrated fluoro-benzoyl-benzoic acid with a reducing agent.

4. In the production of organic fluorine compounds, the step which comprises reacting an amino-fluoro-benzoyl-benzoic acid with a ring-closing agent.

5. In the production of amino-fluoro-anthraquinones, the process which comprises reacting a benzoyl-benzoic acid containing fluorine in the benzene nucleus of the benzoyl group, but having at least one position in said nucleus ortho to the $$-\overset{|}{C}=O$$

radical unsubstituted, with a nitrating agent, reacting the nitrated product with a reducing agent and treating the reduction product with a ring-closing agent.

6. In the production of amino-fluoro-anthraquinones, the process which comprises reacting a 4-fluoro-benzoyl-o-benzoic acid, having at least one position in the benzene nucleus of the benzoyl group ortho to the $$-\overset{|}{C}=O$$

group unsubstituted, with a nitrating agent, reacting the nitrated product with a reducing agent and treating the reduction product with a ring-closing agent.

7. In the production of amino-fluoro-anthraquinones, the process which comprises reacting 4-fluoro-benzoyl-o-benzoic acid with a nitrating agent, reducing the resultant product to an amine and reacting the reduction product with a ring-closing agent.

8. In the production of amino-fluoro-anthraquinones, the process which comprises reacting 4-fluoro-benzoyl-o-benzoic acid with a nitrating acid containing at least molecularly equivalent proportions of $HNO_3$ while maintaining the temperature relatively low, treating the nitrated product with nascent hydrogen to reduce it to an amine, reacting the reduced product with a concentrated sulfuric acid at a temperature of about 170° C. to 200° C. and diluting the resultant product with water.

9. In the production of amino-fluoro-anthraquinones having most probably the following formulæ:

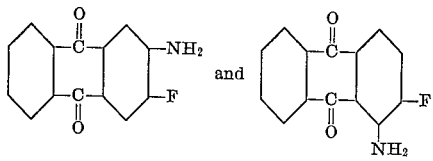

the process which comprises dissolving 4-fluoro-benzoyl-o-benzoic acid in concentrated sulfuric acid at a relatively low temperature, adding thereto a nitrating acid containing at least molecularly equivalent proportions of $HNO_3$ while maintaining the temperature relatively low, isolating the nitrated product, dissolving said product in an aqueous solution of ethyl alcohol containing hydrochloric acid, gradually adding iron to the resultant product, maintaining a temperature of about 50 to 100° C. until the reducing action is substantially complete, then making the product slightly alkaline, separating the solid product and neutralizing it, treating this product with concentrated sulfuric acid at a temperature of about 170 to 200° C. until no further dehydration and ring-closure occurs, diluting the reaction mixture to a sulfuric acid concentration of about 80%, filtering, boiling the residue with water, recovering the resultant solid material, being most probably 2-amino-3-fluoro-anthraquinone, further diluting the 80% sulfuric acid filtrate with water and recovering the solid product formed, being most probably largely 1-amino-2-fluoro-anthraquinone.

10. In the production of amino-fluoro-anthraquinones having most probably the following formulæ:

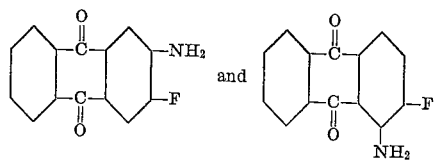

the process which comprises dissolving 100 parts of 4-fluoro-benzoyl-o-benzoic acid in about 210 parts of 100% sulfuric acid at a temperature of about 10 to 50° C., adding a mixture of about 57 parts of nitrating acid containing about 46.5% $HNO_3$ and 51.4% $H_2SO_4$ and 145 parts of 25% oleum slowly to the cooled solution, agitating the product at a temperature of about 50° C., then isolating the product by dilution with ice or water, the product being most probably 3-nitro-4-fluoro-benzoyl-o-benoic acid, dissolving about 385 parts of this product in a solution of 419 parts of ethyl alcohol, 108 parts of water and 6 parts of 37% hydrochloric acid, gradually adding 64 parts of metallic iron in subdivided form to the mixture, maintaining said mixture at a temperature of about 50° to 100° C. until reduction is substantially complete, adding sufficient sodium carbonate to render the product alkaline, separating the solid product and neutralizing it, the resultant product being most probably 3-amino-4-fluoro-benzoyl-o-benzoic acid, then dissolving about 369 parts of this product in 1110 parts of 100% sulfuric acid, maintaining the temperature of the resultant mixture at about 200° C. until ring-closure is substantially complete, then diluting the reaction mixture to a sulfuric acid concentration of about 80%, filtering, boiling the residue with water, and recovering the solid material thus obtained, being most probably 2-amino-3-fluoro-anthraquinone, further diluting the 80% sulfuric acid filtrate with water and recovering the solid product formed, being most probably largely 1-amino-2-fluoro-anthraquinone.

11. As new products, amino-anthraquinones containing fluorine.

12. As a new product, a nitro-fluoro-benzoyl-benzoic acid.

13. As a new product, a compound which is most probably 3-nitro-4-fluoro-benzoyl-o-benzoic acid, being obtainable by the nitration of 4-fluoro-benzoyl-o-benzoic acid at relatively low temperatures and having a melting point of about 172°–3° C.

14. As a new product, a compound which is most probably 3-amino-4-fluoro-benzoyl-o-benzoic acid being light tan in color and melting at approximately 151° C., said compound being obtainable by reducing the compound of claim 13.

15. In a process of producing amino-fluoro-anthraquinones, the step which comprises isolating amino-fluoro-anthraquinones by fractional crystallization from a solvent.

16. In the process of manufacturing fluorine-containing benzoylbenzoic acids and aminoanthraquinones therefrom, the step which comprises mono-nitrating 4′-fluoro-2-benzoylbenzoic acid in the 3′-position.

17. In the manufacture of fluorine-containing benzoyl-benzoic acids and aminoanthraquinones therefrom, the process which comprises mono-nitrating 4′-fluoro-2-benzoylbenzoic acid in the 3′-position and reducing the resulting nitro compound to an amino compound.

18. In the manufacture of fluorine-containing benzoylbenzoic acids and aminoanthraquinones therefrom, the process which comprises mono-nitrating 4′-fluoro-2-benzoylbenzoic acid in the 3′-position, reducing the resulting nitro compound to an amino compound and effecting ring closure.

19. In the manufacture of fluorine-containing benzoylbenzoic acids and aminoanthraquinones therefrom, the process which comprises mono-nitrating 4′-fluoro-2-benzoylbenzoic acid in the 3′-position, reducing the resulting nitro compound to an amino compound and effecting ring closure by heating said amino compound in concentrated sulfuric acid.

20. In the manufacture of fluorine-containing benzoylbenzoic acids and aminoanthraquinones therefrom, the process which comprises mono-nitrating 4'-fluoro-2-benzoylbenzoic acid in the 3'-position, reducing the resulting nitro compound to an amino compound, cyclizing said amino compound and separating the resulting isomeric amino-anthraquinones by successive dilution.

21. New products suitable for use as dyes and intermediates and having a structure consisting of two benzene radicals joined by at least one —CO— group, one of said radicals being substituted by a fluorine atom in the 4'-position para to the said —CO— group, and in the 3'-position with a substituent selected from a group consisting of —NH$_2$ and —NO$_2$; the second of said benzene radicals being substituted in the 2-position ortho to the —CO— group with a substituent selected from a group consisting of —COOH and —CO—, the second bond of the said —CO— group being then attached to the first benzene radical in the 6'-position.

22. Dye intermediates having the probable formula

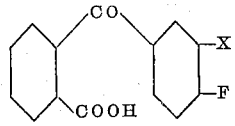

wherein X represents NH$_2$ or NO$_2$.

23. As new products, fluoroaminoanthraquinones selected from a class consisting of the 2,3- and the 2,1- substituted fluoroaminoanthraquinones.

24. As a new product a mixture of 2,3- and 2,1-fluoroaminoanthraquinones resulting from the cyclization of 4-fluoro-3'-amino-2-benzoylbenzoic acid.

25. As a new product, 2,3-fluoroaminoanthraquinone.

26. As a new product, 2,1-fluoroaminoanthraquinone.

FRANK WILLARD JOHNSON.

CERTIFICATE OF CORRECTION.

Patent No. 2,013,657.  September 10, 1935.

FRANK WILLARD JOHNSON.

It is hereby certified that error appears in the printed specification of the above numbered patent requiring correction as follows: Page 1, second column, line 24, for "45" read 145; and that the said Letters Patent should be read with this correction therein that the same may conform to the record of the case in the Patent Office.

Signed and sealed this 26th day of November, A. D. 1935.

(Seal)

Leslie Frazer
Acting Commissioner of Patents.